(12) United States Patent
Roach et al.

(10) Patent No.: US 9,027,076 B2
(45) Date of Patent: May 5, 2015

(54) METHOD AND APPARATUS FOR CONTEXT AWARE MOBILE SECURITY

(75) Inventors: Kyle J. Roach, Severn, MD (US); Alex Hrybyk, Linthicum, MD (US); John S. Morrison, Crownsville, MD (US); Kathleen M. Kauffman, Olney, MD (US); Eric B. Jones, Westmont, NJ (US); Mark Lohrum, Silver Spring, MD (US); Kenneth R. Good, Glen Burnie, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/428,859

(22) Filed: Mar. 23, 2012

(65) Prior Publication Data

US 2013/0254831 A1 Sep. 26, 2013

(51) Int. Cl.
*H04L 29/06* (2006.01)
*H04W 12/08* (2009.01)

(52) U.S. Cl.
CPC .............. *H04L 63/20* (2013.01); *H04L 63/107* (2013.01); *H04W 12/08* (2013.01)

(58) Field of Classification Search
CPC ..... H04L 63/20; H04L 63/107; G06F 21/121; G06F 21/123; G06F 21/62
See application file for complete search history.

(56) References Cited

U.S. PATENT DOCUMENTS

| | | | |
|---|---|---|---|
| 6,556,819 B2 | 4/2003 | Irvin | |
| 7,000,116 B2 | 2/2006 | Bates et al. | |
| 7,308,251 B2 | 12/2007 | Karaoguz | |
| 7,308,703 B2 | 12/2007 | Wright et al. | |
| 7,869,789 B2 | 1/2011 | Hassan et al. | |
| 8,127,292 B1* | 2/2012 | Dobrovolskiy et al. | 718/1 |
| 2002/0051540 A1* | 5/2002 | Glick et al. | 380/258 |
| 2003/0217122 A1* | 11/2003 | Roese et al. | 709/219 |
| 2005/0138370 A1* | 6/2005 | Goud et al. | 713/164 |
| 2005/0226468 A1 | 10/2005 | Deshpande et al. | |
| 2006/0036730 A1* | 2/2006 | Graham et al. | 709/224 |
| 2007/0006321 A1* | 1/2007 | Bantz et al. | 726/27 |
| 2007/0157287 A1* | 7/2007 | Lim | 726/1 |
| 2007/0169171 A1* | 7/2007 | Kumar et al. | 726/2 |
| 2008/0046960 A1* | 2/2008 | Bade et al. | 726/1 |
| 2008/0096529 A1 | 4/2008 | Zellner | |
| 2008/0189776 A1* | 8/2008 | Constable | 726/7 |
| 2008/0222707 A1* | 9/2008 | Pathuri et al. | 726/4 |
| 2008/0271109 A1* | 10/2008 | Singh et al. | 726/1 |
| 2008/0289007 A1* | 11/2008 | Malik | 726/4 |
| 2009/0019521 A1* | 1/2009 | Vasudevan | 726/3 |
| 2009/0077620 A1* | 3/2009 | Ravi et al. | 726/1 |
| 2009/0113216 A1* | 4/2009 | Chen et al. | 713/189 |
| 2009/0319771 A1 | 12/2009 | Nagaraja | |
| 2009/0328225 A1* | 12/2009 | Chambers et al. | 726/26 |

(Continued)

FOREIGN PATENT DOCUMENTS

JP 2004265286 A 9/2004

*Primary Examiner* — Darren B Schwartz
(74) *Attorney, Agent, or Firm* — Ronald E. Prass, Jr.; Prass LLP

(57) ABSTRACT

An approach is provided for causing a change in a security policy of a device based on contextual information. The approach involves determining context information associated with a device. The approach also involves determining a security policy of the device. The approach further involves determining a change of the context information. The approach additionally involves processing the determined change of the context information to cause, at least in part, a revision of the security policy of the device.

12 Claims, 7 Drawing Sheets

(56) References Cited

U.S. PATENT DOCUMENTS

| | | |
|---|---|---|
| 2010/0048167 A1 | 2/2010 | Chow et al. |
| 2010/0100941 A1 | 4/2010 | Eom et al. |
| 2010/0122314 A1* | 5/2010 | Zhang et al. ............ 726/1 |
| 2010/0293590 A1* | 11/2010 | Dandabany ............ 726/1 |
| 2011/0055890 A1* | 3/2011 | Gaulin et al. ............ 726/1 |
| 2011/0092185 A1 | 4/2011 | Garskof |
| 2011/0113471 A1* | 5/2011 | Hjelm et al. ............ 726/1 |
| 2011/0113488 A1* | 5/2011 | Schultz et al. ............ 726/21 |
| 2011/0162033 A1* | 6/2011 | Feinstein et al. ............ 726/1 |
| 2011/0167472 A1* | 7/2011 | Evans et al. ............ 726/1 |
| 2011/0167488 A1 | 7/2011 | Roy et al. |
| 2012/0185910 A1* | 7/2012 | Miettinen et al. ............ 726/1 |
| 2012/0204235 A1* | 8/2012 | Jaudon et al. ............ 726/4 |
| 2012/0297459 A1* | 11/2012 | Olshansky et al. ............ 726/4 |
| 2012/0331527 A1* | 12/2012 | Walters et al. ............ 726/4 |

\* cited by examiner

METHOD AND APPARATUS FOR CONTEXT AWARE MOBILE SECURITY

FIELD OF DISCLOSURE

The disclosure relates to a method and apparatus for causing a change in a security policy of a device based on contextual information associated with the device.

BACKGROUND

Service providers and device manufacturers (e.g., wireless, cellular, etc.) are continually challenged to deliver value and convenience to consumers by, for example, providing compelling network services. One area of interest involves applying the right security policies to the right mobile device at the right time and under the right circumstances, while guarding against potential or actual cyber threats, in order to securely operate and access sensitive data in an appropriate way. For example, a mobile device user may want to carry one device that has access to his own personal services, but also has access to various secure services. Secure service providers may want to enable the user to carry one device that has access to the secure services while protecting the secure services from malicious activity that may be associated with, or have access to the secure services by way of, the user's personal services.

SUMMARY

Therefore, there is a need for an approach to cause a change in a security policy of a device based on contextual information associated with the device.

According to one embodiment, a method comprises determining context information associated with a device. The method also comprises determining a security policy of the device. The method further comprises determining a change of the context information. The method additionally comprises processing the determined change of the context information to cause, at least in part, a revision of the security policy of the device.

According to another embodiment, an apparatus comprises at least one processor, and at least one memory including computer program code for one or more computer programs, the at least one memory and the computer program code configured to, with the at least one processor, cause, at least in part, the apparatus to determine context information associated with a device. The apparatus is also caused to determine a security policy of the device. The apparatus is further caused to determine a change of the context information. The apparatus is additionally caused to process the determined change of the context information to cause, at least in part, a revision of the security policy of the device.

According to another embodiment, a computer-readable storage medium carries one or more sequences of one or more instructions which, when executed by one or more processors, cause, at least in part, an apparatus to determine context information associated with a device. The apparatus is also caused to determine a security policy of the device. The apparatus is further caused to determine a change of the context information. The apparatus is additionally caused to process the determined change of the context information to cause, at least in part, a revision of the security policy of the device.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1:
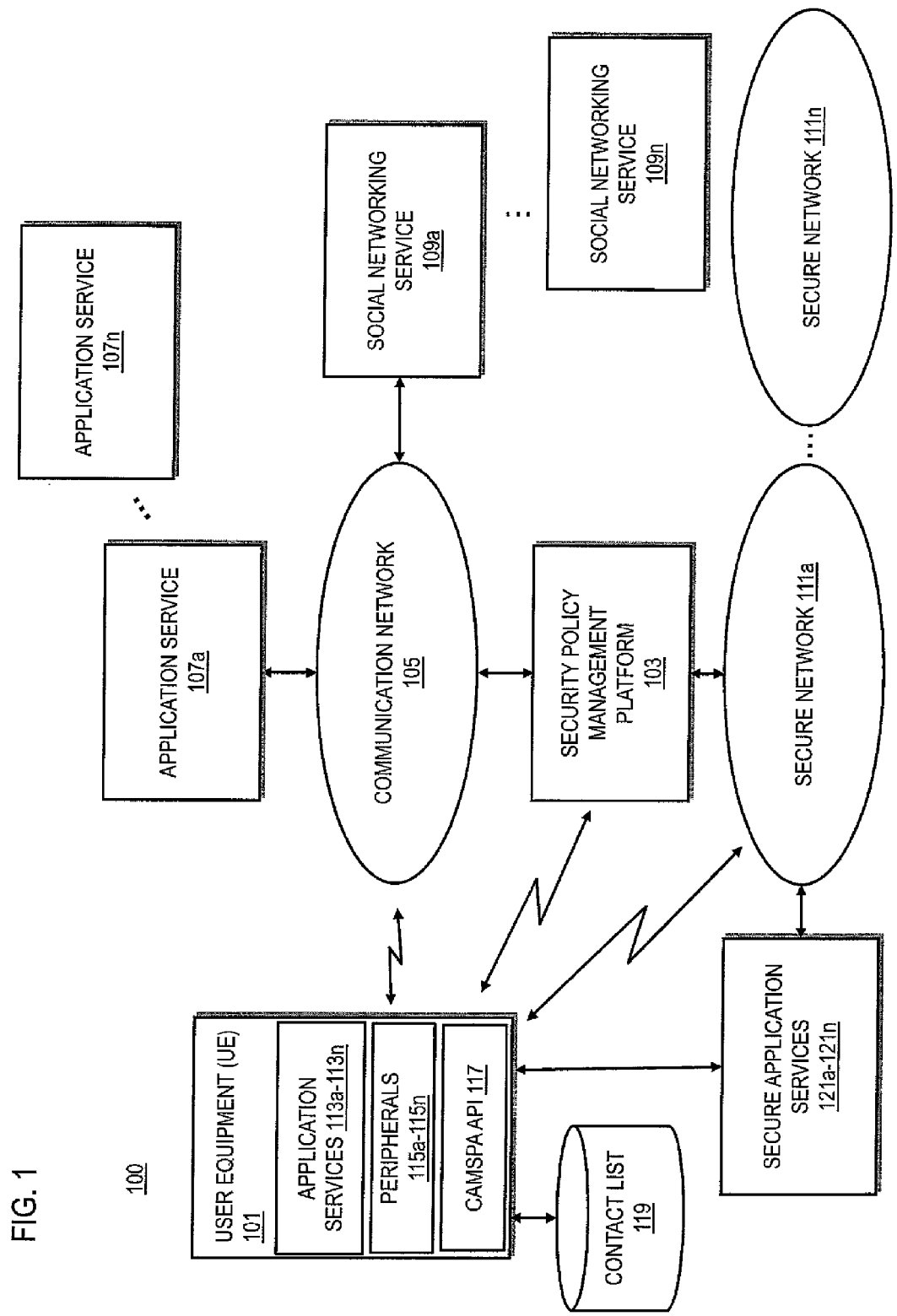
FIG. 1 is a diagram of a system capable of causing a change in a security policy of a device based on contextual information associated with the device, according to one embodiment.

Examples of a method, apparatus, and computer program for causing a change in a security policy of a device based on contextual information associated with the device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term content refers to any item of interest such as, for example but not limited to, any person, place, thing, data set, data entry, restaurant, coupon, event, item for sale, store, news article, internet link, movie, television show, travel destination, etc.

The term "application service" refers to any application, controller or firmware that is accessible by a device or manages the functionality of a peripheral of the device, whether onboard or off board the device.

The term "context" refers to data that indicates the state of a device or the inferred state of a user of the device, or both. The states indicated by the context are, for instance, described according to one or more "context parameters" including, but not limited to, time, date, recent applications running on the device, recent World Wide Web pages presented on the device, keywords in current communications (such as emails, SMS messages, IM messages), current and recent locations of the device (e.g., from a global positioning system, GPS, or cell tower identifier), movement, activity, mission parameters, perceived threat, a suspicious activity such as an attempt to access a secure program, a number of unsuccessful login attempts to the device or a secure program or network, or a change in user credentials, for example, eating at a restaurant, drinking at a bar, watching a movie at a cinema, watching a video at home or at a friend's house, exercising at a gymnasium, traveling on a business trip, traveling on vacation, etc.), emotional state (e.g., happy, busy, calm, rushed, etc.), interests (e.g., music type, sport played, sports watched), contacts, or contact groupings (e.g., family, friends, colleagues, etc.), a current configuration of the devices such as device settings, preferences, and/or network connectivity, among others, or some combination.

The term "security context" refers to an applied understanding of what security level and appropriate application service accessibility should be allowed in a particular context.

The term "security policy" includes, but is not limited to, any combination of one or more of: (1) the operational limits of policies, including geographic boundaries, operational time windows, mission-type limits or user sets for which the mobile security policies apply; (2) security conditions or threat limits under which policies apply, to include the probability, type and severity of threats against mobile devices or against the networks the devices seek to access; (3) network status, to include operational factors and threat factors; (4) enablement or disablement of sensors, device drivers, library elements, virtual machines, security containers, operating system capabilities, and applications on the mobile device; (5) use of cryptographic protection for data at rest and data in transit; and (6) allowable actions by users and devices.

The term "context dependent policy" refers to security policies which change according to dynamic criteria.

The term "context aware mobile security policy application (CAMSPA)" refers to a system of mobile devices and networks which can allocate, negotiate and remediate mobile security policies automatically according to dynamic criteria.

The term "security container" refers to a capability for separating data, applications and functionality at different levels of sensitivity on the same portable device. The data, applications and functions could include device drivers, software libraries, applications, and documents, for example.

The term "hypervisor" refers to a technology for creating multiple virtual machines on the same hardware device.

The term "CAMSPA-aware network" refers to a network designed to assist and enforce security policy applications for any device operating on the network.

The term "CAMSPA-aware enterprise" refers to an enterprise incorporating one or more CAMSPA-aware networks that enforces context aware policies back to the level of databases and documents.

FIG. 1 is a diagram of a system capable of causing a change in a security policy of a device based on contextual information associated with the device, according to one embodiment.

Service providers such as commercial providers, private providers, secure providers such as those in the Intelligence community, the Department of Defense, and Law Enforcement communities, for example, need an automated way for mobile devices such as smart phones to comply with rigorous security policies and levels of control that depend on user, location, time, mission, activity, network, data, perceived threat, etc. Current approved practices for applying different security policies for mobile computer operation within different contexts depend on error-prone human actions. Malicious users can easily bypass fixed data protection measures using the mobility and processing power of mobile devices such as smart phones, for example.

Proposed solutions to this problem fall short of the security requirements for enabling users to roam freely into and out of multiple secure environments, secure missions, and controlled geographic areas, with mobile devices and networks adapting automatically to new policies as the environment and threat change. This is because the security of mobile devices on sensitive networks is not a problem limited to the devices. Rather, the problem extends to network and enterprise capabilities as well as to end point authentication, and to the person controlling the device.

For example, current and proposed solutions fail to recognize that the operational security of mobile devices encompasses and simultaneously depends on user, location, time, mission, activity, network, data, and threat, and that configuration of the phone and the network need to be dynamically adjusted to protect both data and a mission. Rather, current systems require a device to be locked for a particular purpose or assigned a particular network access, for example.

Currently, Bring-Your-Own-Device models for mobile computing systems have not been applied to high security or high sensitivity operations because they either demand that the user who purchased the device conform to enterprise policies, or that the user manually, or semi-manually, switches policies as the mission and/or context changes. Remote users may establish VPN tunnels and launch layered encryption in conjunction with RSA authentication in order to access protected enterprise cloud services. While this protects data in transit via encryption, it does not, by itself, secure the mobile device sending and receiving the data; it also does not, by itself, deal with the issue of who is controlling the phone.

As an example of a potentially error-prone procedure, users in the field may boot up a machine from a disk containing a standardized operating system with approved security policies and applications, and launch a script for a secure network connection. When the specialized activity is completed, the user may reboot the machine to restore the original environment. This, of course, causes problems of whether the manual process of booting and re-booting is actually performed.

Also, when a user enters a secure facility, he or she may be required to disable certain features on the device in order to comply with policies associated with the secure facility. For example, use of any of a camera that is part of the phone or remotely accessible, talking and/or texting, emailing, or other network services such as social networking, or location tracking may not be in accordance with the security policies of the secure facility. Accordingly, smart phone technology has created new challenges. Additionally, small form factor devices fit in pockets, where these can be easily forgotten as a user walks into a controlled area.

To address these problems, a system 100 of FIG. 1 introduces the capability to cause a change in a security policy of a device based on contextual information associated with the device. Such a change or revision of the security policy of the device may be accomplished by way of a Context Aware Mobile Security Application, for example.

Context Aware Mobile Security Policy Application (CAMSPA) is about applying the right security policies to the right mobile device at the right time and under the right circumstances, while guarding against potential or actual cyber threats, in order to securely operate and access sensitive data in an appropriate way.

There are five implications of CAMSPA:

First, CAMSPA implies that both the mobile device and the network are aware of the security context and risks, and apply security policies accordingly, in an automated way.

Second, CAMSPA implies that an automated negotiation occurs between the mobile device and a sensitive data network, such that the device and the user controlling the device provide evidence to the sensitive network that (1) the user is authorized to access the network, and (2) the device is configured properly for the network and risk level.

Third, CAMSPA implies that the automated switching of security policies on a mobile device is performed in a secure manner, even if the mobile device is not connected to a network and the switching of security policies is based on a contextual change such as time, location, user credential change, mission term expiration, perceived threat or suspicious activity, etc.

Fourth, CAMSPA implies that a network responds to requests for access from mobile devices and mobile users by taking some action or set of actions based on evidence about the device and user, and that these actions could include, but are not limited to (1) admitting the device and user to the network; (2) admitting the device and/or user to some limited level of interaction with the network; (3) reconfiguring the device to comply with security policies of the network; (4) blacklisting the device and/or user from the network.

Fifth, CAMSPA implies that if a mobile device and user have been granted access to a network, and the behavior, configuration, operational context or security context of the device and/or user of the device changes, then the context aware network adapts appropriately in order to defend itself.

For example, consider the President of the United States. If the President has a smart phone and makes a secure phone call on his smart phone from the Oval Office, a secure facility, or a sensitive compartmented information facility (SCIF), the device is properly configured to operate in that environment. Both the device and the user have been authenticated to the secure network in the office. The President then walks out of the office, onto the White House lawn, stops, and makes a quick phone call. The President's device senses it is operating in a different environment, and therefore enables access to features and capabilities that were deactivated in the SCIF. The President then boards a helicopter and closes the door. The security policies for a SCIF may now apply again inside the helicopter.

During the helicopter ride to Andrews AFB, for example, the network inside the helicopter may detect unusual behavior from the President's phone. The network may temporarily block access to certain data, networks and/or application services to prevent data exfiltration. Such a change in network access settings may cause a message to appear on the phone's display such as "Security update is required (Critical). If you agree, the device will be temporarily unavailable." If the President pushes the 'Agree' button. The network may remediate the problem by performing a firmware update. Before landing, the phone is once again operational. The President climbs out of the helicopter onto the tarmac, the phone switches networks and security policies, and the President places another phone call. The President then boards Air Force One, and the phone switches security policies once again based on the sensed location of being inside Air Force One.

As another example, consider a Forward Air Controller needs to use a smart phone to call in precision fire against an enemy position during a specified period of operation. The mission applications may require a combination of processing on the smart phone, remote cloud access, or simply access to data stored on the smart phone. Accordingly, a mission based security policy may be implemented if contextual parameters match the mission parameters such as time and/or location, for example. If remote cloud access is needed, the phone communicates with a battlefield network that has certain security and encryption requirements. The phone may even be controlled and/or configured remotely by someone who has the appropriate authority and knowledge for conducting the operation. But, if network access is not needed or required, the phone may be configured to allow access to mission applications and/or data without network connectivity.

Then, when the owner of the device moves from the field into a secure headquarters, the new environment may require different security policies. For example, the headquarters may maintain all classified data in a secure cloud, and require phones to operate as thin clients, with no trace of data retained in non-volatile memory. Or, when the mission is determined to be over, or the device moves to a new location outside of the mission parameters, accessibility to the mission applications and/or data, and/or the remote cloud, for example, may be revoked because of a change in context which is not in accordance with the mission security policy currently being implemented by the smart phone. But, when the same user moves into an urban area with a commercial network infrastructure, it should be possible for him or her to order pizza from a local restaurant and download a game to the phone, confident that the right security policies for that environment have been applied on the phone.

Accordingly, in the examples above, the smart phone must be aware of its environment and the policies that govern it. If a mission is to be conducted only within a specified period of time, then the capabilities on the phone should be disabled when the operational period ends to prevent unauthorized access to weaponized applications, for example. If security policies apply only within a certain geographic area, such as the boundaries of a SCIF or a Class A Security Area, then capabilities and policies should be disabled outside the area to prevent data leakage or unauthorized data access. If it is possible to distinguish between a device being 'on mission' versus 'off mission', then a controlling authority, or set of policies established by an authority, should be able to turn capabilities and applications on and off appropriately.

As another example, consider a diplomat, working from a secure location in an embassy situated in a foreign country, makes a secure phone call from his smart phone. The phone call is made as a Voice Over Internet Protocol (VOIP) call that uses a wireless network in the foreign embassy for access to public Internet. The phone and application recognize the request is for a secure voice session from what is essentially a 'public' location. The call, for example, may be to a military attaché in another country, who is 'on tour', evaluating local conditions. The phone used by the diplomat making the call may establish a secure tunnel to a U.S. server for purposes of routing and monitoring the call. The U.S. server evaluates the potential security threat based on time and geography of both ends of the phone call, and alerts the caller and/or the receiver concerning a type and expected duration of a detected threat, and precautions that the caller and/or the receiver should take on the phone call.

As shown in FIG. 1, the system 100 comprises a user equipment (UE) 101 having connectivity to a security policy management platform 103, application services 107a-107n (collectively referred to as application service 107), and social networking services 109a-109n (collectively referred to as social networking service 109) via a communication network 105. The UE 101 also has selective connectivity to one or more secure networks 111a-111n (collectively referred to as secure network 111). According to various embodiments, the security policy management platform 103 may be remote from or onboard the UE 101. For instance, the security policy management platform 103 may not require network connectivity to implement a particular context specific security policy or revision of a security policy of the UE 101.

In one or more embodiments, the UE 101 may also have application services 113a-113n (collectively referred to as application service 113), peripherals 115a-115n (collectively referred to as peripheral 115), a CAMSPA application protocol interface (API) 117 and a contact list 119 onboard the UE 101. Alternatively, the peripheral 115, CAMSPA API 117, and/or contact list 119 may be accessible remotely from the UE 101 by way of any of the communication network 105 or secure network 111, for example.

As discussed above, CAMSPA is a package of capabilities and services resident on mobile devices and on networks that enable users to roam freely into and out of secure environments, secure missions, and controlled geographic areas, with the mobile devices and networks adapting automatically to new policies as the environment and threat change.

According to one or more embodiments, the security policy management platform 103 applies CAMSPA and accordingly causes the right security policies to be applied on the UE 101 at the right time and under the right circumstances in order to securely operate and access sensitive data in an appropriate way.

According to various embodiments, the security policy management platform 103 enables users to have control over their personal application services 107 and/or 113, content and capabilities of their own UE 101 while reserving control of secure applications 121a-121n (collectively referred to as secure application 121) for particular contexts. Secure application 121 may be onboard the UE 101 or accessible only by way of the secure network 111, or accessible only when the UE 101 has a security policy implemented that enables connectivity the secure network 111, and capabilities for secure network 111 which may be any number of specific secure networks, enterprises and/or missions that engage the UE 101. For example, by implementing a particular security policy associated with a perceived context of the UE 101, certain or all application services 113 may be limited while certain or all secure applications 121 may be accessible if, for example, a security policy to enable such accessibility were caused to be implemented by the security policy management platform 103 based on the perceived context of the UE 101.

In one or more embodiments, a UE 101 may have connectivity to the communication network 105, or not. The security policy management platform 103 determines a context of the UE 101 an may cause the UE 101 to revise a security policy of the UE 101 to cause the UE 101 to switch networks from the communication network 105 to the secure network 111, or simply join the secure network 111 if the UE 101 is not connected to the communication network 105 (if, for example, the UE 101 is out of service) based on a determined change of the context of the UE 101, or allow the UE 101 to have connectivity to both the communication network 105 and the secure network 111 if the UE 101 is so capable and the security policy of the secure network 111, for example, allows for such open connectivity to communication network 105.

Any access to the secure network 111 facilitated by the security policy management platform 103 assures that data is not leaked before, during or after switching to allow secure network access based on a context change. Accordingly, the security policy management platform 103 not only switches a security policy enabling network access of the UE 101 to the secure network 111, based on context (user, location, time, mission, activity, network, data, and threat), but switches securely, according to criteria such as a context dependent policy, established by the secure network 111 which may be a CAMSPA-aware network and/or enterprise which may be a CAMSPA-aware enterprise being engaged, for example.

Such secure switching is caused by an application of any mobile security policy of any secure network 111 that the UE 101 has permission to access. Additionally, the secure switching of security policies may be facilitated by the secure network 111 pushing its own security policy onto the UE 101 so that any connectivity to the secure network 111 is based on the security policies of the secure network 111, and security policy of the UE 101 as well as any applications 113 onboard the UE 101 may be caused to adapt to the security policies of the secure network 111.

The mobile security policy, as discussed above, includes, but is not limited to, any combination of one or more of: (1) the operational limits of policies, including geographic boundaries, operational time windows, mission-type limits or user sets for which the mobile security policies apply; (2) security conditions or threat limits under which policies apply, to include the probability, type and severity of threats against mobile devices or against the networks the devices seek to access; (3) network status, to include operational factors and threat factors; (4) enablement or disablement of sensors, device drivers, library elements, virtual machines, security containers, operating system capabilities, and applications on the mobile device; (5) use of cryptographic protection for data at rest and data in transit; and (6) allowable actions by users and devices.

Accordingly, the secure switching to the secure network 111 may include, for example, the security policy management platform 103 communicating with the CAMSPA API 117 to revise the security policy of the UE 101 or being implemented by the UE 101 to cause one or more of the application services 107, one or more of application services 113, one or more of peripherals 115, one or more of social networking services 109, and/or the contact list 119 to have any connectivity and/or functionality shut down, or any connectivity and/or functionality be limited when the UE 101 is enabled to have connectivity to the secure network 111 in accordance with a security policy of the secure network 111. The limitations may occur when the UE 101 actually has access to the secure network 111, or at the time a security policy enabling connectivity to the secure network 111 is implemented.

In one or more embodiments, the CAMSPA API 117 may also revise the security policy of the UE 101 to cause any memory on board the UE 101 that is non-volatile, for example, or associated with any personal application service 107, 113, and/or peripherals 115 to be cleared when the security policy enabling connectivity to the secure network 111 is implemented.

In other words, application services 113 available on the UE 101 or application services 107 available to the UE 101 must also adapt to transitions in the security environment such as changing or revising security policies.

In one or more embodiments, the CAMSPA API 117 may be or incorporate a hypervisor, or act as a security container, for example, that causes the UE 101 to run multiple virtual machines having differing security policies. For example, different virtual operating systems may implement individual security policies so that any application services 107 or 113, for example, may have controlled access, if any, when the UE 101 has connectivity the secure network 111 or if the UE 101 is on a mission and is implementing a mission security policy. Or, for example, a different virtual operating system may block access to any secure applications 121, or hide such applications from a user interface of UE 101, for example, unless a corresponding security policy is implemented by the security policy management platform 103 so that the security policy of the device is one that is in accordance with a virtual operating system that enables access to secure application 121.

In one or more embodiments, the security policy management platform 103 may act as a container for various security policy setting files so that the security policies may be pushed to the CAMSPA API 117, for example, regardless of whether the security policy management platform 103 is onboard or remote from the UE 101. The security policy setting files describe appropriate settings for different security policies. The UE 101 may be configured to dynamically load the security policy setting files based on a determined context.

In one or more embodiments, the UE 101 may boot into different operating systems which may or may not be loaded over the secure network 111, for example. When changing security policies, a new operating system may be caused to be loaded by the security policy management platform 103.

In one or more embodiments, certain secure applications 121 may communicate with the security policy management platform 103 and/or the CAMSPA API 117 to determine context of the UE 101 and allow or disallow access to certain application services 113 and/or secure applications 121 based on a security policy that is associated with the determined context. Alternatively, a secure application 121 may have its own security policy that may be implemented based on a determined context. In this instance, the security policy of the secure application 121 may communicate with the CAMSPA API 117 to cause the security policy of the UE 101 to be revised to implement the security policy of the secure application 121 based on the determined context.

In one or more embodiments, accessibility to the secure network may not only be based on the determined context of the UE 101, but also must be in accordance with the mobile security policy of the secure network 111. As such, since network and application permissions are related to the user of the UE 101, any determined change in the user identified to the device, or sensed by the device, may cause the UE 101 to have its connectivity to the secure network 111 revoked by having its current security policy enabling secure network 111 connectivity revised to a policy that does not enable connectivity to the secure network 111, for example.

If any change in security policy occurs that causes connectivity to the secure network 111 to be revoked, the security policy management platform 103 determines the cause of the change in security policy and may cause an alert to be displayed by the UE 101 indicating such change in security policy has occurred. Depending on the cause of the change in security policy, the change in security policy that causes the revocation of the connectivity to the secure network 111 may be temporary or permanent. For example, if the security policy management platform 103 detects a suspicious activity such as an attempt to access an application service 113 that the UE 101 should not have access to when connected to the secure network 111, an attempt by any application service 113 to access data available by way of the secure network 111 or by way of a secure application 121, or a strange course of events that occur such as a number of failed log-in attempts, or a change in user credentials associated with the device, for instance, at a secure facility employing the secure network 111, the security policy management platform 103 causes the access to the secure network 111 to be dropped.

Alternatively, if network connectivity is not an issue or not required, but a security policy of the device allows access to the secure applications 121, such as a mission security policy, or other time or location based policy, then the security policy management platform 103 may react similarly to that discussed above and cause access to any secure applications 121 or secure data to be revoked based on any change in context such as a perceived threat, change in location, end of mission, suspicious activity, etc., and the security policy management platform 103 will determine the cause of the change in security policy that resulted in a revocation of access and determine whether the change in security policy revoking access to the secure application 121, for example, should be temporary or permanent.

If the suspicious behavior is determined to be normal, then the change in security policy is temporary, and the UE 101 may be allowed to have access to the secure network 111 again. If the suspicious behavior is deemed to be malicious, then the UE 101 may have any enabled connectivity to the secure network 111, and/or the secure applications 121, revoked permanently, and the UE 101 may be "blacklisted" until it can be refreshed by an authorized network manager or device support specialist. In other words, the UE 101 may have any security policy that enables connectivity to the secure network 111 or secure applications 121 permanently made unavailable. A suspicious behavior may be deemed normal, for example, if certain security policy thresholds are not breached. For example, if a suspicious activity may be an unsuccessful attempt to log-in, one security policy may have a threshold of 3 failed attempts before flagging the event as malicious, while another security policy may be of a higher level security and one failed attempt may be deemed malicious.

In one or more embodiments, the security policy enabling access to the secure network 111 and/or secure applications 121 (in a case where there is no network connectivity) may also be revised if the security policy management platform 103 determines a change in context information, user credentials, security settings of the UE 101 and/or security settings of the secure network 111. For example, if the UE 101 determines that the user of the UE 101 is not the user authorized to use the device, access to the secure network 111 and/or secure applications 121 may be revoked by causing the UE 101 to change security policies to one that does not enable access to the secure network 111 and/or secure applications 121. Also, if the context information changes, e.g. the user moves from a secure facility employing the secure network 111 to a public space, or if a mission or time frame for accessing the secure network 111 changes or ends, then security policy enabling connectivity to the secure network 111 may be changed such that connectivity to the secure network and/or secure applications 121 are revoked in the same manner.

Upon changing security policies that causes the revocation, the revocation of access may, as discussed above, be temporary or permanent depending on the particular parameters of the allowed access. For example, an employee at a government facility may have the ability to walk into the office and have access to the secure network 111 employed by the office and any secure applications 121 accessible while a security policy that enables connectivity to the secure network 111 is implemented on the UE 101. While having access to the secure network 111, the UE 101 may be locked out, or have limited access to the communication network 105, any applications services 107 and 113, any peripherals 115, contact list 119, and social networking service 109, for example, based on the security policy of the secure network 111. But, when the UE 101 leaves the office, the security policy enabling connectivity to the secure network 111 may be temporarily changed or revised until the user returns to the office. After leaving, the security policy management platform 103 causes a change in security policy of the UE 101 that causes a secure switching of connectivity of the UE 101 from the secure network 111 to a public access of the communication network 105, or just temporarily revoking access to the secure network 111 and not joining communication network 105 (in a case where service is not available, for example, or the user decided to turn off the UE 101's connectivity to the communication network 105.

When switching out of the secure network 111, the security policy management platform 103 does this switching securely as well by causing the CAMSPA API 117 to revise the security policy of the UE 101 to lock down any secure applications 121 that may be resident on the UE 101 and clearing any non-volatile memory, for example, that may be associated with any secure applications 121 and/or the secure network 111. For example, by changing the security policy of the UE 101, the UE 101 may access a different virtual machine, as discussed above, for a security policy that does not concern the secure applications 121, and accordingly lock out access to any secure application services and/or cause a memory to be cleared when that particular virtual machine is not accessible in accordance with the revised security policy.

Accordingly, the user may enjoy full usage of the UE 101 for personal use outside of the secure network 111 or any mission parameters, for example, as needed, but have the UE 101 automatically adapt to have connectivity to the secure network 111 by changing security policies, or have access to various secure applications 121 by changing security policies based on a change in contextual data, as needed. The UE 101 may also be configured to have connectivity to any number of secure networks 111 as the user is allowed to have access to. So, as discussed in the example above regarding the President, a user having access to many secure networks may see any number of switches occur to adapt to any number of mobile security settings of any number of secure and unsecure networks 111, 105.

According to various embodiments, any secure network 111 implementing the mobile security settings applying CAMSPA controls as discussed above may also be configured to, by way of the security policy management platform 103, not only evaluate evidence presented by UE 101's that they are properly configured for implementing a particular security policy to enable network use and under control of the correct person, or implementing a particular policy to have access to particular secure applications 121 in accordance with contextual data, but may also detect rogue devices (other UE 101's, for example that may be nearby, or attempting to hack into the UE 101 and/or the secure network 111) to mitigate misbehavior and threats so as to defend itself. For example, if the security policy management platform 103 perceives a threat from a rogue UE 101, the security policy management platform 103 may cause the UE 101 to change a current security policy from one that enables secure network 111 and/or secure application 121 or secure memory access to another security policy that does not enable such connectivity or access.

By way of example, the communication network 105 and/or the secure network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any protocol or network type not yet developed, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, security policy management platform 103, application services 107, social networking services 109, and secure applications 121 communicate with each other and other components of the communication network 105 and/or the secure network 111 the using well known, new or still developing protocols. In this context, a protocol includes a set of rules defining how the network nodes within the communication network 105 and/or the secure network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
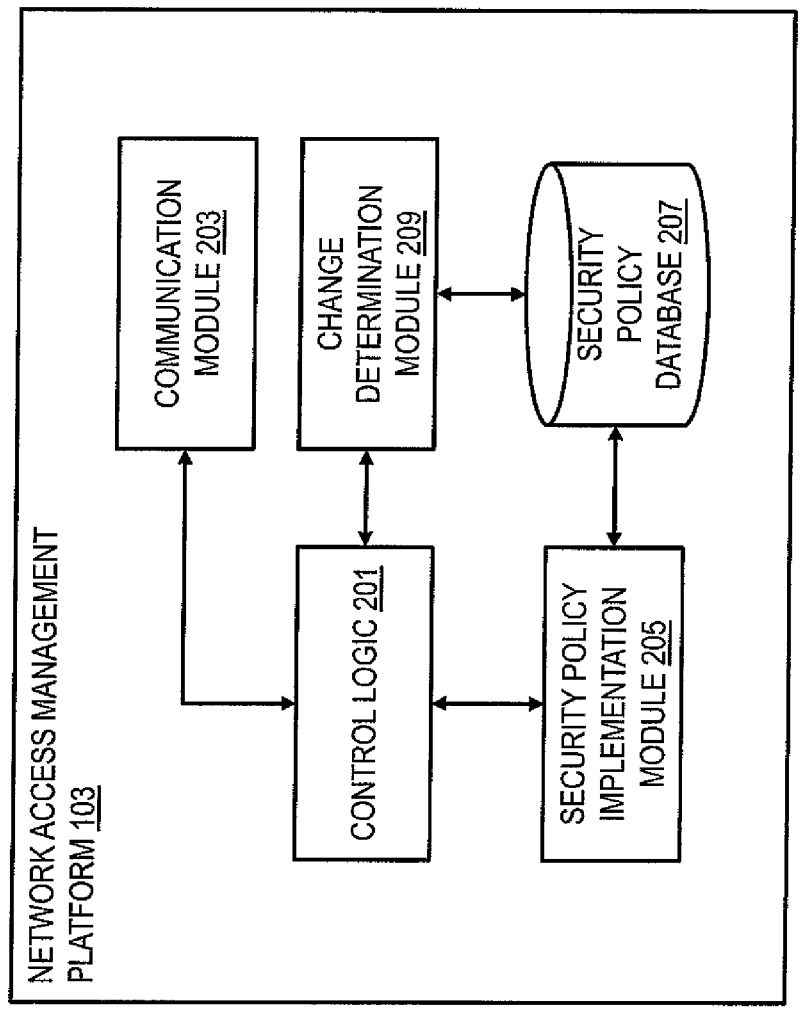
FIG. 2 is a diagram of the components of a security policy management platform, according to one embodiment.

FIG. 2 is a diagram of the components of the security policy management platform 103, according to one embodiment. By way of example, the security policy management platform 103 includes one or more components for causing a change in a security policy of a device based on contextual information associated with the device. It is contemplated that the functions of these components may be combined in one or more components or performed by other components of equivalent functionality. In this embodiment, the security policy management platform 103 includes a control logic 201, a communication module 203, a security policy implementation module 205, a security policy database 207, and a change determination module 209.

According to various embodiments, the control logic 201 causes the security policy implementation module 205 to assess any received context information such as location, time, or any of the examples discussed above, which may include user credentials, security settings of the UE 101, etc., any security policies associated with any detected available network, and/or any security policies of activated secure applications 121 all communicated to the security policy management platform 103 by way of the communication module 203. The security policy implementation module 205 is caused to communicate with the security policy database 207 to determine what security policies the UE 101 should implement in view of the context information, security policies of the UE 101, security policies of the available detected network, and/or the security policies of any secure application 121. Then, based on an assessment that the UE 101 should implement a particular security policy, the security policy implementation module 205 causes the UE 101 to implement a security policy found in the security policy database 207 that is in accordance with any of the above discussed context information, or it may determine that a security policy of a detected secure network 111 or a secure application 121 should be implemented.

The communication module 203 may be configured to continually receive context information, updates regarding user credentials, and security policies of a detected network that the UE 101 may or may not have connectivity to at any predetermined time interval. For example, the shorter the interval, the more secure the network because it will detect changes in context, user credentials, security settings, threat levels, mission parameters, etc. more frequently and not be exposed to a delay. Accordingly, depending on the degree of security, the refresh rate of context information, etc. may be a function of the mobile security policy of any secure network 111 that the UE 101 has permission to access.

As such, the predetermined time interval may be on the order of milliseconds, seconds, minutes, hours, etc. depending on the level of security desired. The change determination module 209, upon determining that there is a change to any of the context information, user credentials, or security policies or the network, for example, indicates to the security policy implementation module 205 that such a change has occurred. Once the indication is given to the security policy implementation module 205, the security policy implementation module 205 may cause the security policy currently implemented by the UE 101 to change. For instance, if the UE 101 has a security policy that enables connectivity to the communication network 105, upon detecting a change, the security policy implementation module 205 may implement a security policy to cause the UE 101 to have connectivity to the secure network 111.

While having connectivity to the secure network 111, if the change determination module 209 recognizes that there is a change to any of the context information, user credentials, security policies of the UE 101 or security policies of the communication network 111, the security policy implementation module 205 may cause the security policy enabling connectivity to the secure network 111 to change so that the connectivity to the secure network 111 is revoked, whether temporarily or permanently depending on a determined cause of the change. For example, if the change determination module 209 flags any of the changes as being malicious or suspicious, then the revocation may be permanent. Similarly, if the security policy implementation module 205 determines that a suspicious activity has occurred at the UE 101 such as a suspicious application running or a detected malicious threat, then the security policy implementation module 205 will cause the security policy of the UE 101 to change such that connectivity to the secure network 111 is revoked. The change in security policy that causes the revocation, in the case of a suspected malicious activity may be permanent, but the security policy implementation module 205 may cause the change in security policy that causes the revocation to be temporary if the suspicious activity is cleared or confirmed in some way by the user, for example.

In one or more embodiments, the security policy caused by the implementation module 205, that enables connectivity to the secure network 111 and/or secure applications 121 may also cause the CAMSPA API 117 to restrict the UE 101 from other network access when accessing the secure network 111 and/or secure applications 121. Additionally, the CAMSPA API 117 may allow access of another approved secure network 111 if possible, for instance, if the UE 101 has multiple antennas allowing for multiple network connections, and the security policies of the device and the various secure networks 111 so permit.

The CAMSPA API 117, as discussed above, may also be instructed to restrict various application services 107 and 113 so that they may not be accessed, or have limited access when the UE 101 has a particular security policy implemented granting access to certain secure applications 121 and/or enabling connectivity to access secure network 111. The CAMSPA API 117 may also cause any non-volatile memory on the UE 101 to be cleared when accessing the secure network 111. When the security policy implementation module 205 changes the security policy such that the connectivity to the secure network 111 and/or access to certain secure applications 121 is revoked, CAMSPA API 117 may also cause any non-volatile memory that may have sensitive data associated with activity on the secure network 111 and/or secure applications 121, for example, to be cleared so that the memory is kept secure.

Figure 3:
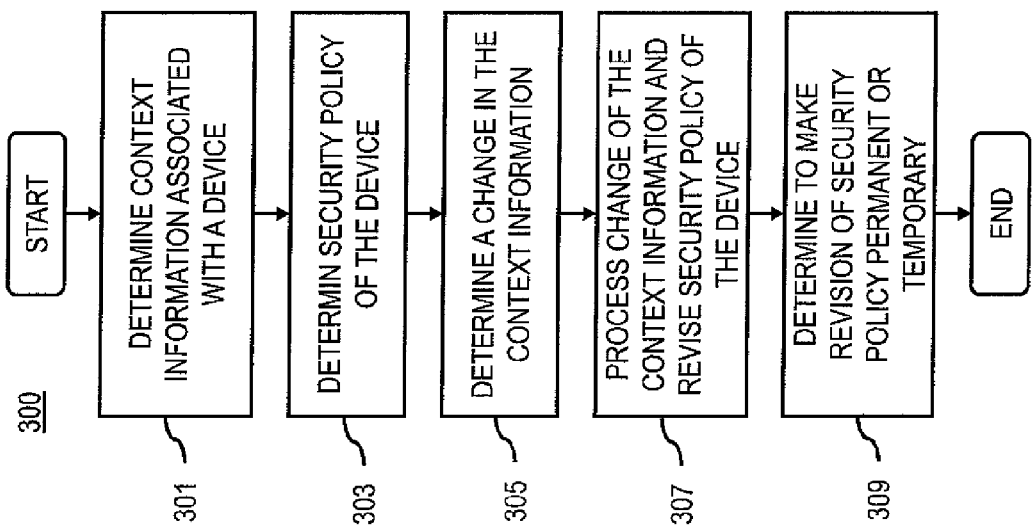
FIG. 3 is a flowchart of a process for causing a change in a security policy of a device based on contextual information associated with the device, according to one embodiment.
Figure 7:
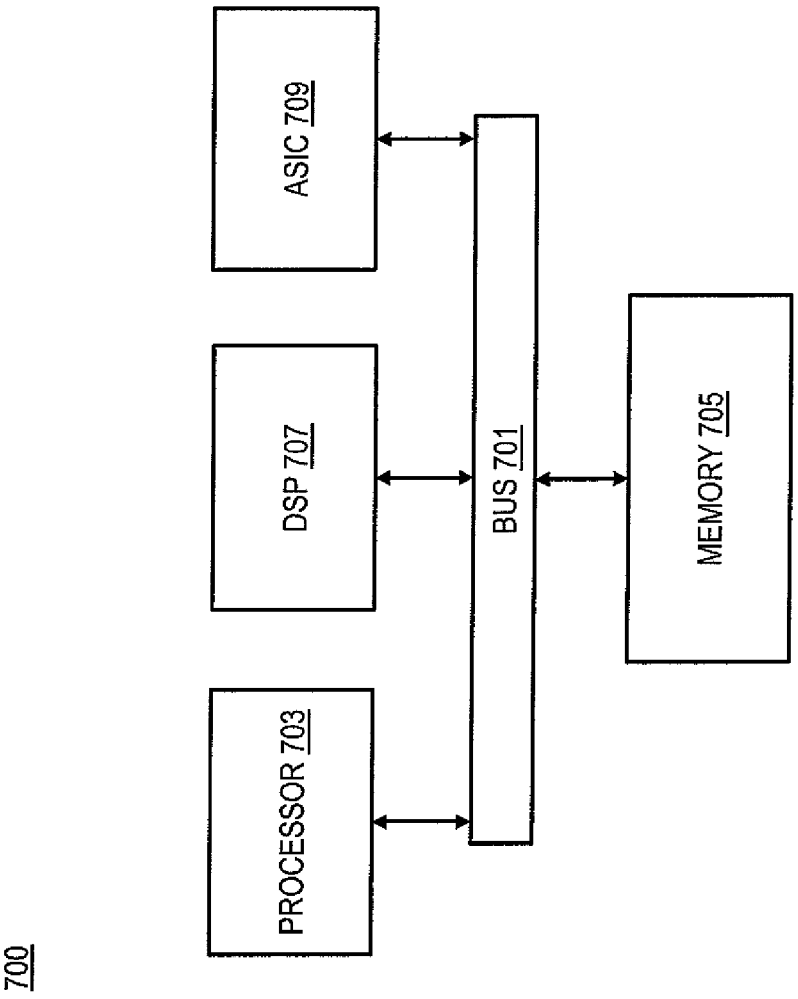
FIG. 7 is a diagram of a chip set that can be used to implement an embodiment of the invention.

FIG. 3 is a flowchart of a process for causing a change in a security policy of a device based on contextual information associated with the device, according to one embodiment. In one embodiment, the security policy management platform 103 performs the process 300 and is implemented in, for instance, a chip set including a processor and a memory as shown in FIG. 7. In step 301, the security policy management platform 103 determines context information associated with the UE 101. Then, in step 303, the security policy management platform 103 determines a security policy of the UE 101. The determined security policy of the UE 101 may be one that is currently implemented or most recently implemented. Next, in step 305, the security policy management platform 103 determines a change of the context information. For example, the UE 101 may move from one location to another, or a time of day may change, or a set of mission parameters may be completed, etc.

The process continues to step 307 in which the security policy management platform 103 processes the determined change of the context information to cause, at least in part, a revision of the security policy of the device. As discussed above, the revision of the security policy may be to change from one policy to another, and the security policy may comprise any combination of policies as tailored to a specific context which may or may not be a combination of various contextual information. For example, a security policy may be any combination of operational limits such as mission parameters (e.g., a time of the mission, place of the mission, goal of the mission, failure mode of the mission, etc.), security limits (e.g., a threshold of what may or may not be a concern for causing an alarm for a breach in security, perhaps a benign email that does not contain certain keywords would not be perceived as a concern whereas an instant message having certain triggers would breach a security limit), threat limits (e.g., a determined suspicious activity being an improper login attempt whereas one or two attempts might be within the allowed limit, but three attempts would breach the threshold), one or more network connectivity allowances and/or revocations of connectivity to networks such as communication network 105 and/or secure network 111, sensor availability allowances such as which peripherals 115 may be accessible for a certain context, cryptographic protection protocols (e.g., messages may be caused to be encrypted when a certain context is determined), memory accessibility allowances, application service accessibility allowances, and user accessibility allowances (e.g., only certain users may have access to the UE 101 or various application services whether secure or unsecure based on context information). It should be noted that the aforementioned examples should not be limiting to the types of security policies that may be implemented on the UE 101.

Then, in step 309, the security policy management platform 103 determines a cause of the revision of the security policy of the UE 101. Next, in step 311, the security policy management platform 103 processes the cause of the revision of the security policy of the device to cause, at least in part, the revision of the security policy of the device to be one of temporary or permanent.

Figure 4:
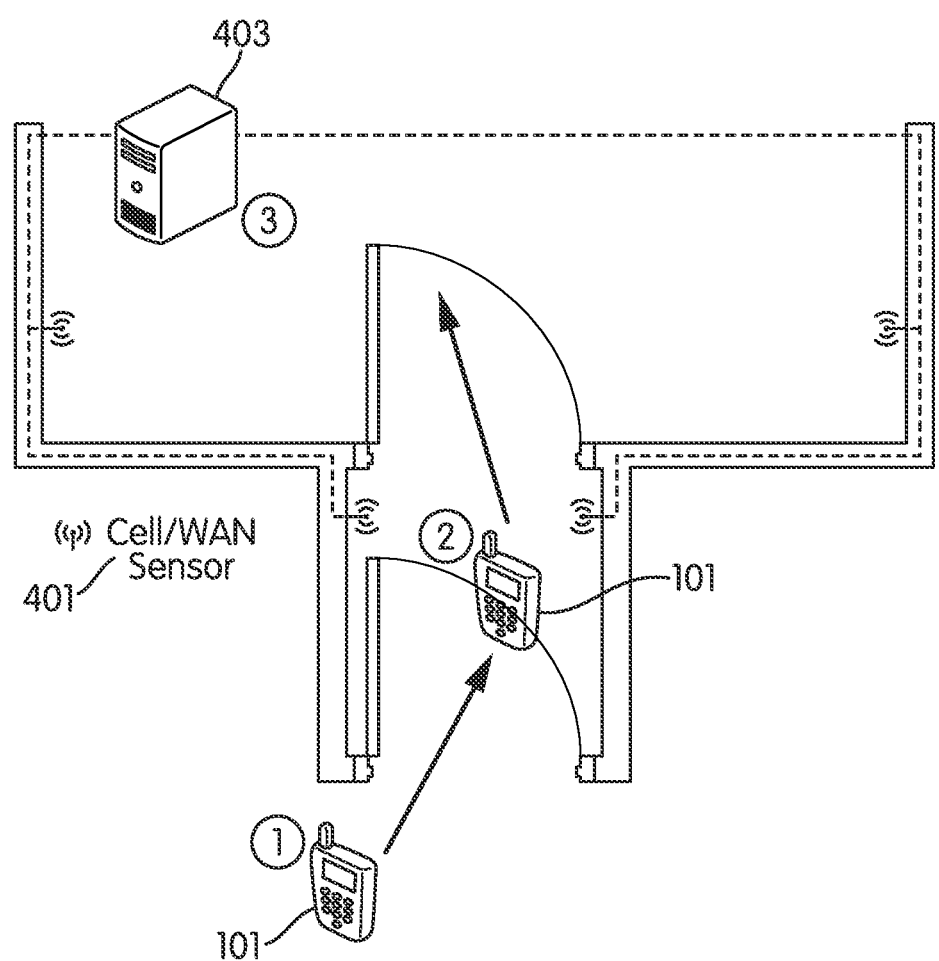
FIG. 4 is a diagram of an example movement of a user device indicating a change in context, according to one embodiment.

FIG. 4 illustrates an example of a progression of a UE 101 from a position 1 to a position 2 to a position 3, according to one example embodiment. At position 1, the UE 101 is in a personal configuration security policy where the UE 101 has connectivity to the communication network 105 and access to any of the application services 107, 113, peripherals 115, contact list 119 and/or social networking service 109. Then, the UE 101 progresses to position 2, at which its context is determined to change. The context may be determined to change by way of any sensors 401, GPS sensors, or any other means for determining the position of the UE 101 such as, for example, a near field communication transmission with a gateway or turnstile upon entry into a secure facility. Position 2, may be a position near a range of a secure network 111, or an area near where a mobile security policy may be implemented because of the location, for example, the UE 101 is determined to be in. Then, if the UE 101 is determined to be registered to interact with the secure network 111 available at position 3 managed by a server 403, then the security policy of the UE 101 may be caused to change such that the UE 101 is allowed to have connectivity to the secure network 111. Upon entry into the secure facility, or upon having a security policy implemented that enables connectivity to the secure network 111, the UE 101 may no longer have access to the communication network 105 and/or any personal application services 107, 113, peripherals 115, contact list 119 and/or social networking service 109. If the device is not registered for accessibility to the secure network 111, or any of the security settings of the UE 101 or the user credentials do not coincide with the mobile security policies of the secure network 111, then a warning message may be presented to the UE 101 and the UE 101 may be blocked from the network. A warning message may also be sent to any system administrator as well to warn of a potential threat to the secure network 111 or any secure facility or mission affiliated with the secure network 111.

It should be noted, that while the example shown in FIG. 4 illustrates entry into a secure facility, any contextual change may be applicable. For example, if a user moves from one side of town to another, or from a mission setting to outside of a mission setting, or a timing of allowable access changes, the indication of the contextual change may cause a security policy to change so that connectivity to the secure network 111 may be enabled or revoked. In other words, the UE 101 need not move into or out of a physical facility, for example.

Figure 5:
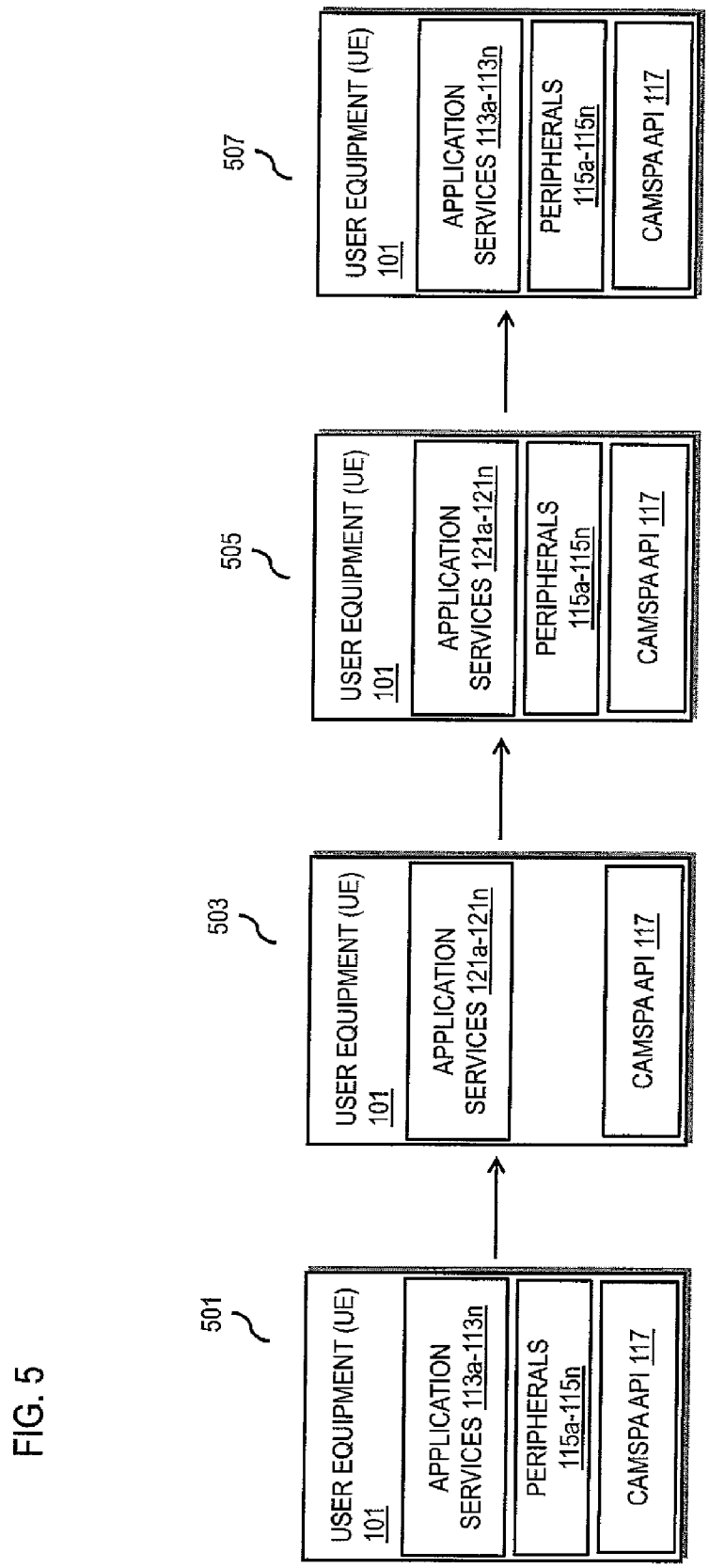
FIG. 5 illustrates diagrams of user interfaces utilized in the processes of FIG. 3, according to various embodiments.

FIG. 5 illustrates example user interfaces 501, 503, 505 and 507 as a user's context may change over time based on movement, or any other parameter such as date and/or time, mission requirements, threat, etc., as discussed above, according to one example embodiment. User interface 501, for example, may correspond to a user interface that may be presented on the UE 101 when a personal security policy is implemented enabling access to the communication network 105, i.e. in a public space, for example. When the security policy enabling access to the public communication network 105 is implemented, or any personal configuration security policy that may be implemented if a network is not available, the UE 101 has access to various personal application services 113a-113n, peripherals 115a-115n such as cameras, microphones, etc. and the CAMSPA API 117. Then, when the UE 101 is moved to a contextual location, or moves into the contextual parameters such as appropriate date and/or time, or mission parameters, for example, the UE 101 may be caused to change security policies such that connectivity secure network 111a is enabled, for example. When a security policy enabling access to the secure network 111a is implemented, user interface 503 is presented on UE 101. User interface 503 locks the user out of any personal application services 113a-113n and does not present them as being available, alternatively, the application services 113a-113n may be presented, but not accessible, or some personal application services 113a-113n may be accessible, or have limited accessibility, depending on the particular mobile security policy of the secure network 111a. The user interface 503 may enable accessibility to various secure applications 121a-121n, for example that may only be accessible on when the UE 101 is accessing the secure network 111a. The CAMSPA API 117 may be accessible on the UE 101 to change settings as needed and/or control the limitations of the secure user interface 503.

Then, depending on the contextual information, the UE 101 may implement a security policy enabling access to still another secure network, secure network 111n, for example, having a different mobile security policy. When accessing the secure network 111n, for example, the UE 101 may have accessibility to various peripherals 115a-115n. For example, if secure network 111n requires the user to have the ability to take pictures, or if the security policy of the secure network 111n is more relaxed and allows the user to take pictures, a peripheral camera may be allowed to be accessed in addition to the various secure applications 121a-121n and the CAMSPA API 117.

Then, if the user context changes again, or the security policy management platform 103 perceives a threat, the UE 101's security policy may again change such that permission to access the secure network 111*n* may be revoked and the UE 101 may join the public communication network 105 again. At this point, the personal application services 113*a*-113*n*, peripherals 115*a*-115*n* and CAMSPA API 117 may be accessible by the UE 101. The security policy enabling connectivity to the secure network 111 is changed such that access is revoked based on the change of contextual information or perceived threat such as a suspicious activity or a change in user credentials so that the secure network 111 may be protected from malicious attacks. Once access to the secure network 111 has been revoked, the UE 101 may be used for personal use such as making calls, using personal application services 113*a*-113*n*, etc. to order a pizza, as discussed above, or for any other reason. The personal usage is allowed because the communication network 105 has been rejoined and security context of the UE 101 is facilitated by the CAMSPA API 117 to return to personal settings enable access to persona application services 107, 113.

In one or more embodiments, when the UE 101 has access to the secure network 111 and the personal application services 113*a*-113*n* are inaccessible, the mobile security policy of the secure network may either protect a user's privacy or exploit it. For example, the personal application services 113*a*-113*n* may have any memory associated with them cleared upon accessing the secure network 111, or have any memory blocked off from a network moderator, for example, to maintain user privacy. However, the mobile security policy may be set such that user information may be collected to determine where the user has been, what information the user has transmitted or processed outside of the secure network 111 by searching the private application services 113*a*-113*n*, or any other memory associated with the UE 101, for example. Such information may be helpful in detecting suspicious activity, or fraudulent user credentials, for example.

Figure 6:
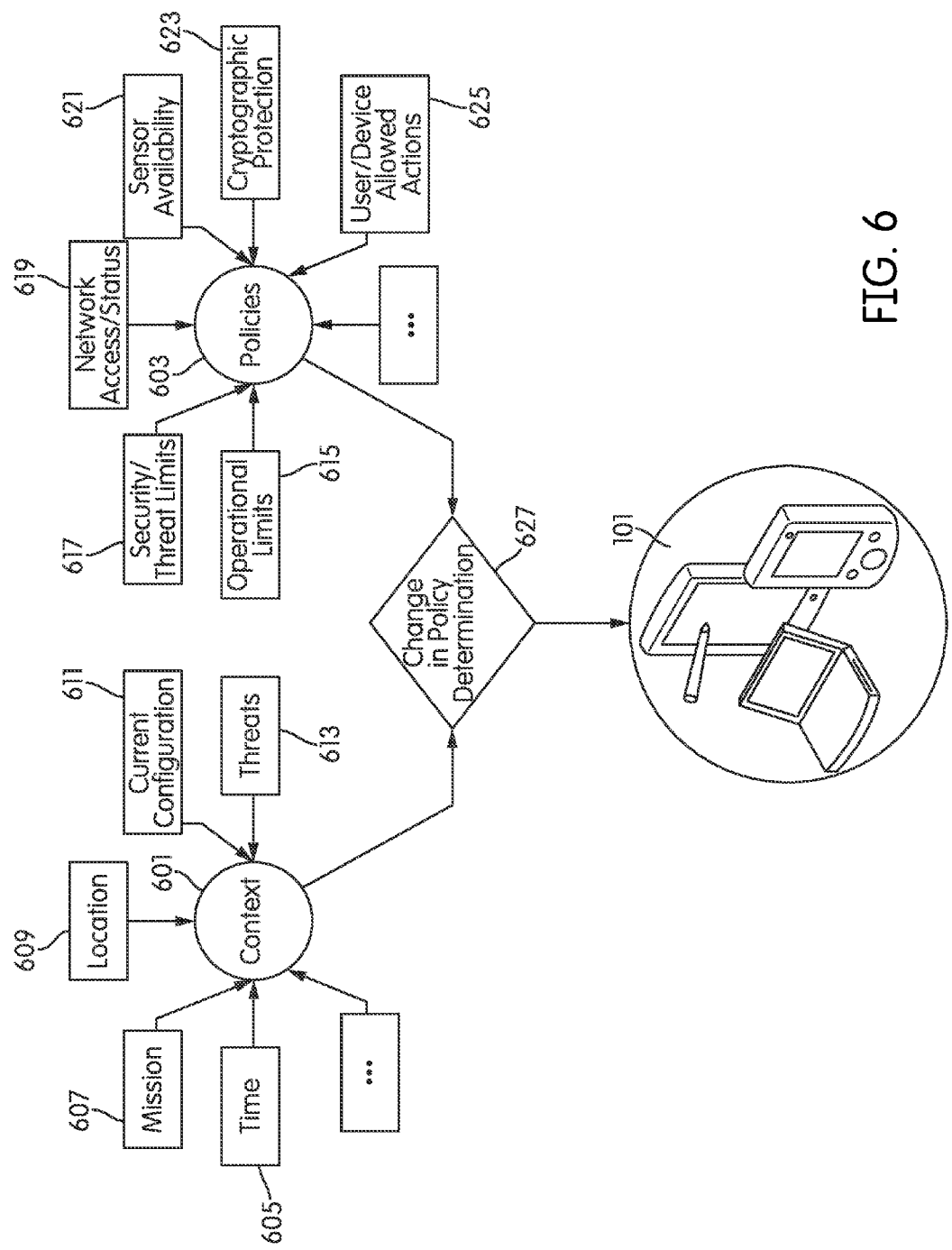
FIG. 6 is a flowchart illustrating the relationships between various example security policies and various example contexts, according to one embodiment.

FIG. 6 is a diagram illustrating the relationship between various example contextual information 601 and various example security policies 603. Any perceived change in contextual information 601 may cause the UE 101 to revise a security policy 603 that the UE 101 is currently implementing.

As discussed above, the contextual information 601 may comprise any combination of a time 605, mission parameter 607, location 609, current configuration of a device 611, a perceived threat or suspicious activity 613, etc. Additionally, a security policy 603 may comprise any combination of operational limits 615, security/threat limits 617, network access allowances 619, sensor or peripheral accessibility 621, cryptographic protection enablement 623, use/device allowed actions or application service accessibility 625, etc.

A security policy may be limited to or be any combination of the above discussed features, and any change in security policy 603 that is to be implemented by the UE 101 may effectively change any of these policy features. For example, if the UE 101 is determined to be at a particular location 609, at a particular time 605, while on a mission 607, the UE 101 may implement a mission specific security policy 603 that is a combination of features such as enabling sensors 621 because a camera is needed for the mission, enabling access to particular secure applications 121 by way of certain use/device allowed actions 625 that are mission requirements, and cause certain communications to be encrypted by implementing cryptographic protection 623.

Then, when any of the context information 601 changes, such as the mission is complete, the time 605 goes outside of mission bounds, or the location 609 changes to one where the UE 101 is no longer in a mission related territory, any of the security policies 603 that are implemented by the UE 101 may be caused to change at 627 by the security policy management platform 103, discussed above, such that the UE 101 no longer has access to certain secure applications 121, as discussed above, other sensors or peripherals 115 may become available, and messages may no longer be encrypted. Or, for example, a security policy 603 may be implemented that puts the entire UE 101 into lockdown because a perceived threat 613 is detected that exceeds a security policy threat limit 617.

The processes described herein for causing a change in a security policy of a device based on contextual information associated with the device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 7 illustrates a chip set or chip 700 upon which an embodiment may be implemented. Chip set 700 is programmed to cause a change in a security policy of a device based on contextual information associated with the device as described herein may include, for example, bus 701, processor 703, memory 705, DSP 707 and ASIC 709 components.

The processor 703 and memory 705 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of causing a change in a security policy of a device based on contextual information associated with the device.

In one or more embodiments, the chip set or chip 700 includes a communication mechanism such as bus 701 for passing information among the components of the chip set 700. Processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one or more embodiments, the processor (or multiple processors) 703 performs a set of operations on information as specified by computer program code related to causing a change in a security policy of a device based on contextual information associated with the device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 701 and placing information on the bus 701. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 703, such as a sequence of operation codes, constitute processor instructions, also called computer system instructions or, simply, computer instructions. Processors may be implemented as mechanical, electrical, magnetic, optical, chemical or quantum components, among others, alone or in combination.

The processor 703 and accompanying components have connectivity to the memory 705 via the bus 701. The memory 705 may include one or more of dynamic memory (e.g., RAM, magnetic disk, writable optical disk, etc.) and static memory (e.g., ROM, CD-ROM, etc.) for storing executable instructions that when executed perform the inventive steps described herein to cause a change in a security policy of a device based on contextual information associated with the device. The memory 705 also stores the data associated with or generated by the execution of the inventive steps.

In one or more embodiments, the memory 705, such as a random access memory (RAM) or any other dynamic storage device, stores information including processor instructions for causing a change in a security policy of a device based on contextual information associated with the device. Dynamic memory allows information stored therein to be changed by system 100. RAM allows a unit of information stored at a location called a memory address to be stored and retrieved independently of information at neighboring addresses. The memory 705 is also used by the processor 703 to store temporary values during execution of processor instructions. The memory 705 may also be a read only memory (ROM) or any other static storage device coupled to the bus 701 for storing static information, including instructions, that is not changed by the system 100. Some memory is composed of volatile storage that loses the information stored thereon when power is lost. The memory 705 may also be a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 703, including instructions for execution. Such a medium may take many forms, including, but not limited to computer-readable storage medium (e.g., non-volatile media, volatile media), and transmission media. Non-volatile media includes, for example, optical or magnetic disks. Volatile media include, for example, dynamic memory. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for modifying a security policy executed on a mobile device, comprising:

first determining, by a processor, first context parameters associated with the mobile device, the mobile device being operated according to one of a plurality of separate and distinct context aware security policies stored in a memory in the mobile device for execution;

automatically operating the mobile device according to a first security policy among the plurality of security policies based on the first determined first context parameters associated with the mobile device;

second determining, by the processor, a change in at least one of the first context parameters to a second context parameter that affects the automatically operating the mobile device according to the first security policy;

automatically selecting, by the processor, a second security policy among the plurality of security policies based on the second determining;

automatically operating the mobile device according to the second security policy of the mobile device based on the second determined change in the at least one of the first context parameters to the second context parameter, a particular network being accessible by the mobile device, the second security policy enabling connectivity of the mobile device to the particular network according to a separate security policy of the particular network;

adapting, by the processor, a third security policy among the plurality of security policies of the mobile device and one or more application services accessible via the mobile device to the separate security policy of the particular network by implementing the separate security policy of the particular network as the third security policy on the mobile device;

third determining, by the processor, a change in at least one other of the first context parameters and a change in the separate security policy of the particular network; and
automatically selecting, by the processor, a fourth security policy among the plurality of security policies based on the third determining, the fourth security policy processing the change in the at least one other of the first context parameters and the change in the separate security policy of the particular network to disable the connectivity of the mobile device to the particular network,
   wherein the processor employs a context aware mobile security policy application stored in the memory in the mobile device, and
   the first context parameters comprise at least one of a date, a time, a temperature, a user command, a communication of the mobile device with a network access node and user credentials associated with the mobile device.

2. The method of claim 1, the adapting by the processor of the one or more application services comprising one or more of (1) a limiting of access rights to the one or more application services, (2) a limiting of access rights of the one or more application services to access the particular network, (3) a limiting of a functionality of the one or more application services, and (4) a clearing of a memory that is accessible by the one or more application services.

3. The method of claim 1, at least the second security policy implementing a change over the first security policy of at least one of (1) a limiting of access rights to one or more application services accessible via the mobile device, (2) a limiting of access rights of the one or more application services to data processed by the mobile device, (3) a limiting of a functionality of the one or more application services, (4) a clearing of a separate memory that is accessible by the one or more application services, and (5) an accessing of one or more secure applications that are not accessible by the mobile device executing the first security policy.

4. The method of claim 1, the plurality of separate and distinct context aware security policies each implementing a different one or more of operational limits, security limits, threat limits, network connectivity allowances, sensor availability allowances, cryptographic protection protocols, memory accessibility allowances, application service accessibility allowances, and user accessibility allowances.

5. A mobile communicating device, comprising:
   at least a first memory storing a plurality of separate and distinct context aware security policies by which the mobile communicating device is operated;
   a sensor that determines at least one of a plurality of context parameters associated with the mobile communicating device; and
   a processor that is programmed to:
      execute a first security policy among the plurality of security policies based on first context parameters associated with the mobile communicating device;
      execute a first determining of a change in at least one of the first context parameters to a second context parameter that affects operation of the mobile communicating device according to the first security policy;
      automatically select a second security policy among the plurality of security policies based on the first determining;
      automatically control operation of the mobile communicating device according to the second security policy of the mobile communicating device based on the first determining of the change in the at least one of the first context parameters, a particular network being accessible by the mobile communicating device and the second security policy enabling connectivity of the mobile communicating device to the particular network according to a separate security policy of the particular network;
      adapt a third security policy among the plurality of security policies of the mobile communicating device and one or more application services accessible via the mobile communicating device to the separate security policy of the particular network by implementing the separate security policy of the particular network as the third security policy on the mobile communicating device;
      execute a second determining of a change in at least one other of the first context parameters and a change in the separate security policy of the particular network; and
      automatically selecting a fourth security policy among the plurality of security policies based on the second determining, the fourth security policy processing the change in the at least one other of the first context parameters and the change in the separate security policy of the particular network to disable the connectivity of the mobile device to the particular network,
   wherein the processor applies a context aware mobile security policy application stored in at least a second memory in the mobile communicating device to process the second determined change in the at least one of the first context parameters, and
   the first context parameters comprise at least one of a date, a time, a temperature, a user command, a communication of the mobile device with a network access node and user credentials associated with the mobile communicating device.

6. The mobile communicating device of claim 5, the adapting of the one or more application services comprising one or more of (1) a limiting of access rights to the one or more application services, (2) a limiting of access rights of the one or more application services to access the network, (3) a limiting of a functionality of the one or more application services, and (4) a clearing of a memory that is accessible by the one or more application services.

7. The mobile communicating device of claim 5, at least the second security policy implementing a change over the first security policy of at least one of (1) a limiting of access rights to one or more application services accessible via the mobile communicating device, (2) a limiting of access rights of the one or more application services to data processed by the mobile communicating device, (3) a limiting of a functionality of the one or more application services, (4) a clearing of a memory that is accessible by the one or more application services, and (5) an accessing of one or more secure applications that are not accessible by the mobile communicating device executing the first security policy.

8. The mobile communicating device of claim 5, the plurality of separate and distinct context aware security policies each implementing a different one or more of operational limits, security limits, threat limits, network connectivity allowances, sensor availability allowances, cryptographic protection protocols, memory accessibility allowances, application service accessibility allowances, and user accessibility allowances.

9. A non-transitory computer-readable storage medium storing instructions which, when executed by one or more processors in a mobile device, cause the one or more processors to execute steps of a method for modifying a security policy executed on the mobile device, comprising:

first determining first context parameters associated with the mobile device, the mobile device being operable according to a plurality of separate and distinct context aware security policies stored in a memory in the mobile device;

automatically operating the mobile device according to a first security policy among the plurality of security policies based on the first determined first context parameters associated with the mobile device;

second determining a change in at least one of the first context parameters to a second context parameter that affects the operation of the mobile device according to the first security policy;

automatically selecting a second security policy among the plurality of security policies based on the second determining;

automatically operating the mobile device according to the second security policy based on the second determined change in the at least one of the first context parameters to the second context parameter, a particular network being accessible by the mobile device, the second security policy enabling connectivity of the mobile device to the particular network according to a separate security policy of the particular network;

adapting a third security policy among the plurality of security policies of the mobile device and one or more application services accessible via the mobile device to the separate security policy of the particular network by implementing the separate security policy of the particular network as the third security policy on the mobile device;

third determining a change in at least one other of the first context parameters and a change in the separate security policy of the particular network; and automatically selecting a fourth security policy among the plurality of security policies based on the third determining, the fourth security policy processing the change in the at least one other of the first context parameters and the change in the separate security policy of the particular network to disable the connectivity of the mobile device to the particular network, wherein the one or more processors communicate with a context aware mobile security policy application stored in the memory of the mobile device, the context aware mobile security policy application being configured to modify the security policy of the mobile device by facilitating selection between the plurality of separate and distinct context aware security policies, and the first context parameters comprise at least one of a date, a time, a temperature, a user command, a communication of the mobile device with a network access node and user credentials associated with the mobile device.

10. The non-transitory computer-readable storage medium of claim 9, the adapting of the one or more application services one or more of (1) a limiting of access rights to the one or more application services, (2) a limiting of access rights of the one or more application services to access the particular network, (3) a limiting of a functionality of the one or more application services, and (4) a clearing of a memory that is accessible by the one or more application services.

11. The non-transitory computer-readable storage medium of claim 9, at least the second security policy implementing a change over the first security policy of at least one of (1) a limiting of access rights to one or more application services accessible via the mobile device, (2) a limiting of access rights of the one or more application services to data processed by the mobile device, (3) a limiting of a functionality of the one or more application services, (4) a clearing of a memory that is accessible by the one or more application services, and (5) an accessing to one or more secure applications that are not accessible by the mobile device executing the first security policy.

12. The non-transitory computer-readable storage medium of claim 9, the plurality of separate and distinct context aware security policies each implementing a different one or more of operational limits, security limits, threat limits, network connectivity allowances, sensor availability allowances, cryptographic protection protocols, memory accessibility allowances, application service accessibility allowances, and user accessibility allowances.

\* \* \* \* \*